United States Patent
Sakakibara et al.

[11] Patent Number: 5,890,370
[45] Date of Patent: Apr. 6, 1999

[54] REFRIGERATING SYSTEM WITH PRESSURE CONTROL VALVE

[75] Inventors: Hisayoshi Sakakibara, Nishio; Shin Nishida, Anjo; Sadahisa Onimaru, Nishio; Yuichi Sakajo, Nishio; Yukikatsu Ozaki, Nishio, all of Japan

[73] Assignee: Denso Corporation, Japan

[21] Appl. No.: 789,210

[22] Filed: Jan. 24, 1997

[30] Foreign Application Priority Data

Jan. 25, 1996 [JP] Japan ..................... 8-011248
Feb. 21, 1996 [JP] Japan ..................... 8-033962

[51] Int. Cl.$^6$ .................................. F25B 9/00
[52] U.S. Cl. ................. 62/222; 62/114; 62/502
[58] Field of Search ............... 62/204, 114, 502, 62/210, 211, 212, 222, 223, 224, 225

[56] References Cited

U.S. PATENT DOCUMENTS

| | | | |
|---|---|---|---|
| 1,739,655 | 12/1929 | Schweller | 62/224 X |
| 1,985,134 | 12/1934 | Yount | 62/222 |
| 3,281,075 | 10/1966 | Smyers, Jr. | 62/223 X |
| 4,205,532 | 6/1980 | Brenan | 62/115 |
| 4,788,828 | 12/1988 | Sato | 62/222 |
| 5,245,836 | 9/1993 | Lorentzen et al. | 62/174 |
| 5,685,160 | 11/1997 | Abersfelder et al. | 62/114 |

*Primary Examiner*—Harry B. Tanner
*Attorney, Agent, or Firm*—Pillsbury Madison & Sutro, LLP

[57] ABSTRACT

A refrigerating system of vapor compression type operating at a super critical area, while obtaining an increased efficiency. The refrigerating system includes a pressure control means for controlling the temperature and the pressure at the outlet of a heat emitter. The pressure control valve responds to a pressure difference between the inlet pressure of the refrigerant to the pressure control valve and the pressure in an outwardly sealed chamber in which the refrigerant is filled such that, with respect to the volume of the chamber under closed condition of the pressure control valve, a density of the refrigerant is in a range between a density of a saturated liquid at a temperature of 0° C. and a density at the critical point of the refrigerant. As a result, the pressure and the temperature at the outlet of the heat emitter is controlled substantially along the optimum control line $\eta$max, resulting in an effective execution of a refrigerating cycle at the critical area.

5 Claims, 15 Drawing Sheets

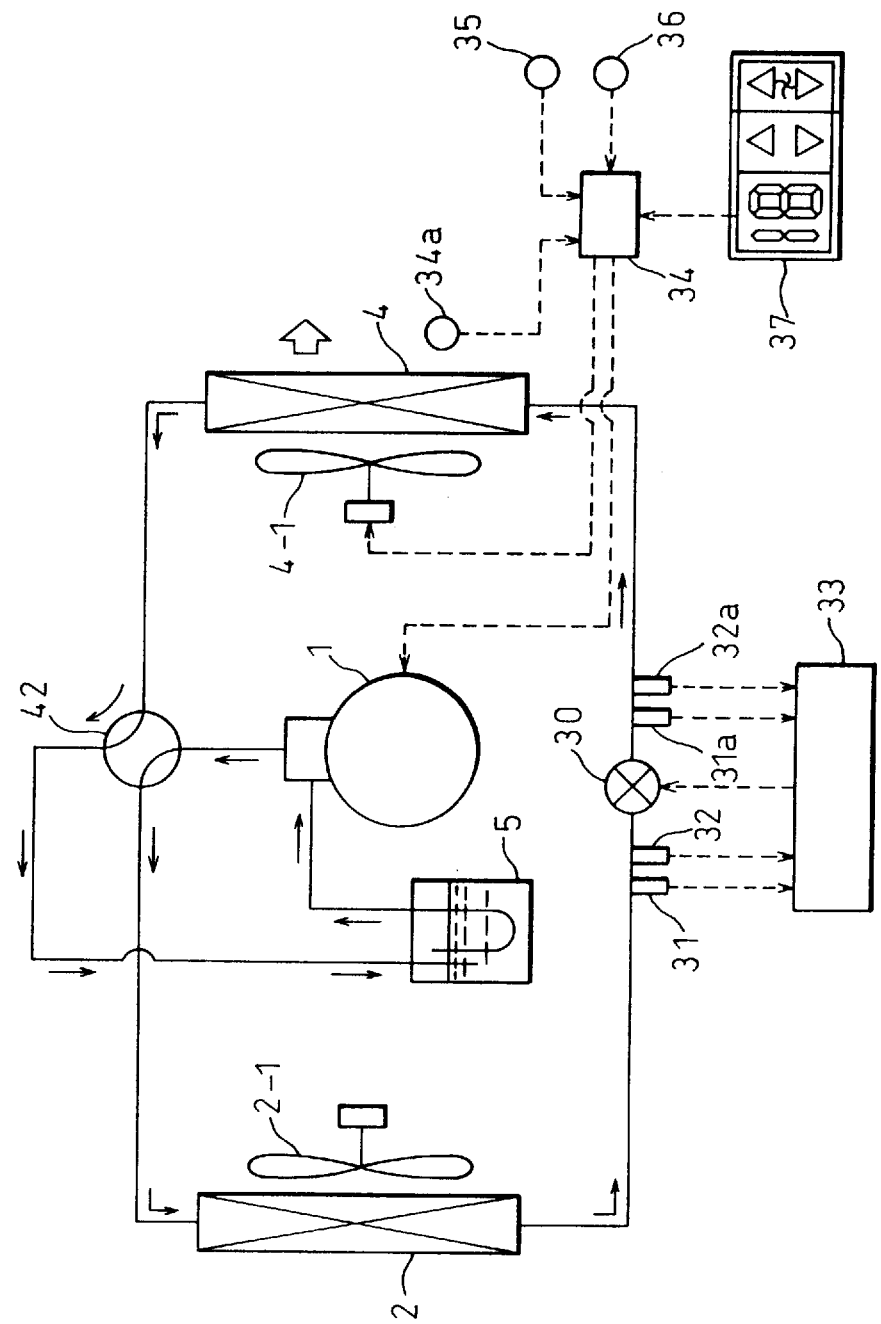

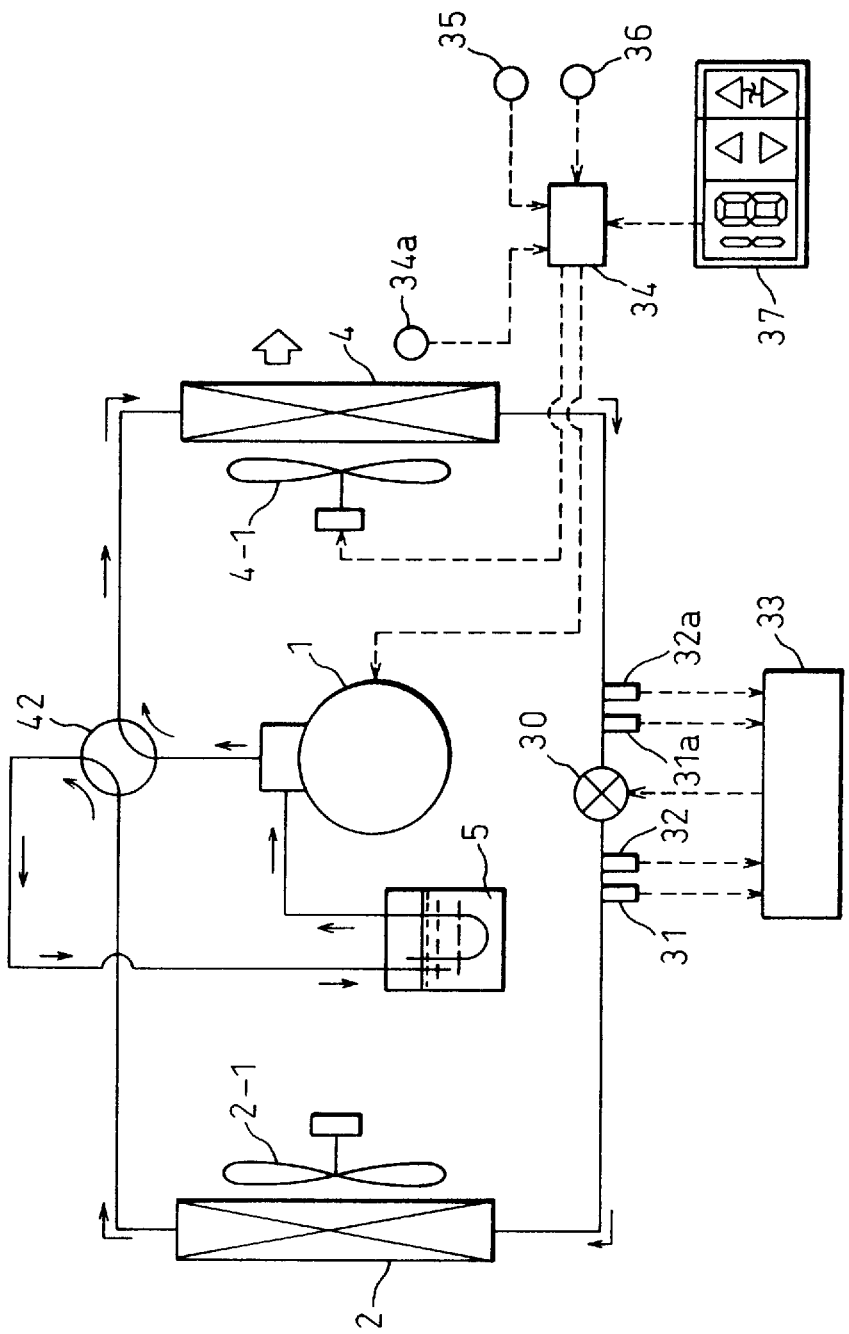

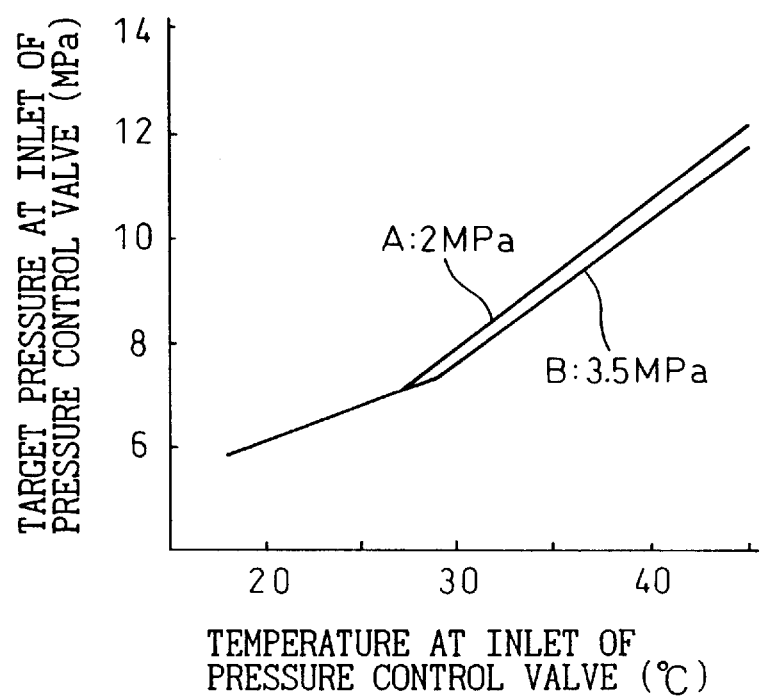

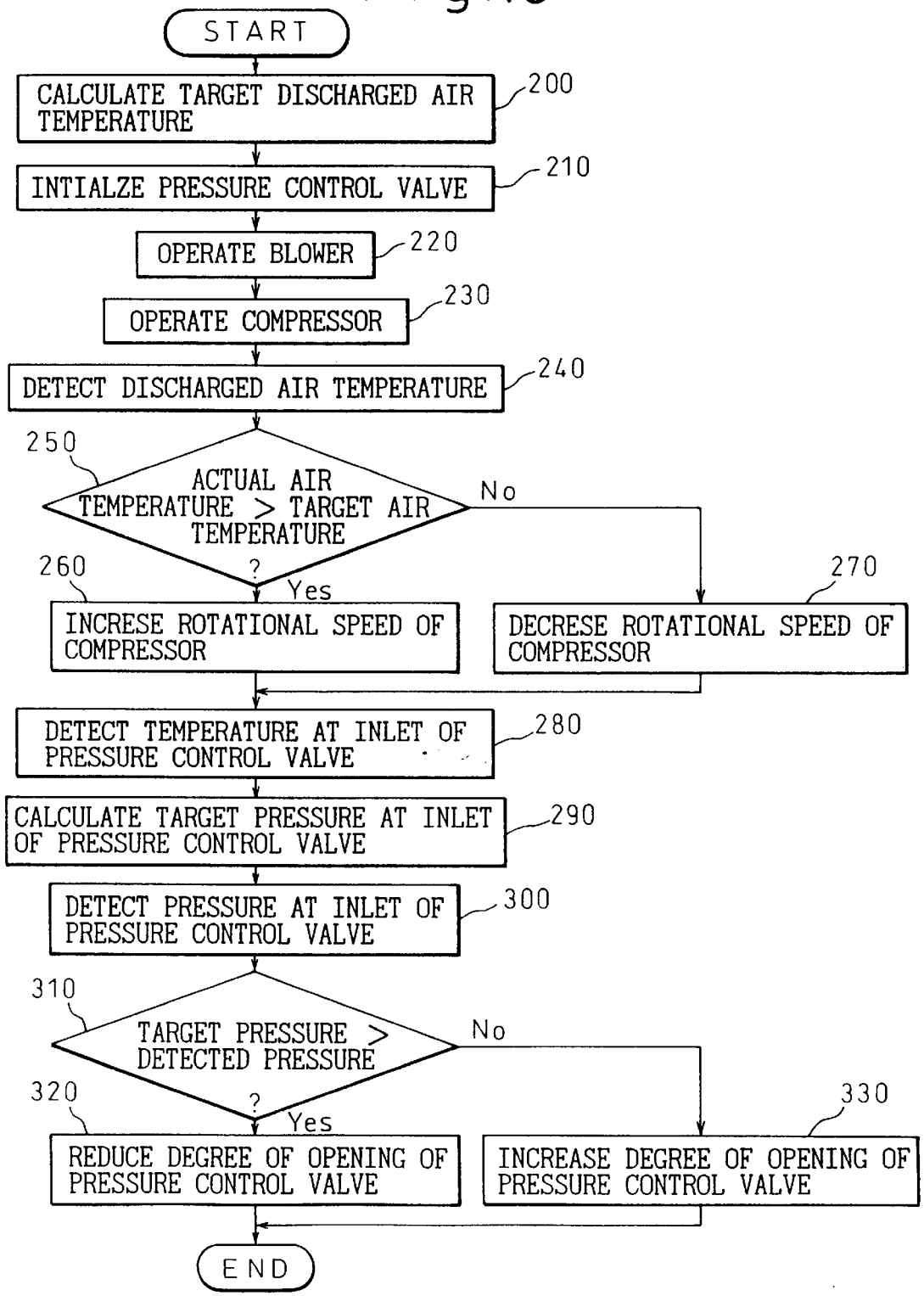

ps5,890,370

REFRIGERATING SYSTEM WITH PRESSURE CONTROL VALVE

BACKGROUND OF THE INVENTION

1. Field of the Invention

The present invention relates to a refrigerating system of a vapor compression type, provided with a pressure control valve for controlling a pressure of a refrigerant at an output side of a heat emitter. The present invention is suitably used for a refrigerating system where a carbon dioxide ($CO_2$), as a refrigerant, is used at a super critical region.

2. Description of Related Art

Recently, it has been required to avoid the use of FREON (chlorofluorocarbon) as a refrigerant in refrigerating systems. Thus, Japanese Unexamined Patent Publication No. 7-18602 discloses a vapor compression type refrigerating system where carbon dioxide ($CO_2$) is used as a refrigerant in place of freon.

The carbon dioxide has a critical temperature as low as 31° C., which makes it possible for the temperature of the carbon dioxide at the outlet of the heat emitter to be higher than the critical temperature, so that the carbon dioxide is prevented from being condensed even at the outlet of the heat emitter. In other words, an increased difference in a enthalpy by condensing the refrigerant can not be obtained as is the case in the conventional refrigerating system using FREON. Thus, in order to increase an enthalpy difference, an increase in the pressure of the carbon dioxide at the outlet of the compressor, i.e., the pressure at the inlet of the heat emitter, is essential. However, an increase in the outlet pressure of the compressor may cause a coefficient of performance to be worsened.

SUMMARY OF THE INVENTION

An object of the present invention is to provide a refrigerating system using as, a refrigerant, carbon dioxide and operating at a critical region, capable of obtaining an increased efficiency.

Another object of the present invention is to provide a refrigerating system using as, a refrigerant, carbon dioxide and operating at a critical region, capable of controlling the temperature and the pressure at an outlet of a heat emitter to obtain an operation substantially along an optimum operating line.

According to the invention, a deflector commences its deflection when the pressure at an upstream chamber is higher than the pressure in a sealingly closed chamber by a predetermined value, causing a valve member to open the valve port. Furthermore, a refrigerant is filled to a volume of said sealingly closed chamber as obtained when said valve member closes said valve port at a density in a range between a value of density of a saturated liquid state refrigerant of a temperature of 0° C. and a value of density of a saturated liquid state refrigerant at the critical point. In this condition, the relationship between the pressure and the temperature of the refrigerant in the closed chamber substantially conforms to an optimum control line. Thus, when the pressure at the outlet of the heat emitter is increased to a pressure along the optimum control line, the pressure control valve opens its valve port. In other words, the outlet pressure and the outlet temperature of the heat emitter is controlled substantially along the optimum control line. Thus, an increased efficiency is obtained when executing the refrigerating cycle of a vapor compression type even at the supercritical range.

In accordance with a further feature of the invention, the pressure control valve is controlled so that the pressure at the inlet of the pressure control valve detected by the pressure sensor is controlled to a target value as determined by the temperature of the refrigerant at the inlet of the pressure control valve detected by a temperature sensor. As a result, the pressure and the temperature at the outlet of the heat emitter is controlled along the optimum control line, resulting in an increase in the efficiency of the vapor compression type not only at a super critical region but also at a region below the super critical region.

In the invention, the pressure control valve is controlled to a target pressure determined by the temperature at the inlet of the pressure control valve and the pressure at the outlet of the pressure control valve. As a result, an effective operation of the vapor compression type refrigerating system is obtained irrespective of an increase in the variation of the pressure of the refrigerant at the outlet of the pressure control valve.

BRIEF EXPLANATION OF ATTACHED DRAWINGS

FIG. 15A is a schematic view of a refrigerating system according to sixth embodiment of the present invention applied to a heat pump system when the latter is in a cooler mode.

FIG. 15B is the same as FIG. 15A but is under a heater mode.

FIG. 16 shows relationships between temperature at the inlet of the pressure control valve and the target value of the pressure at the inlet of the pressure control valve.

FIG. 18 is a flowchart illustrating an operation of the refrigerating system in FIG. 17.

DESCRIPTION OF PREFERRED EMBODIMENTS

First Embodiment

Figure 1:
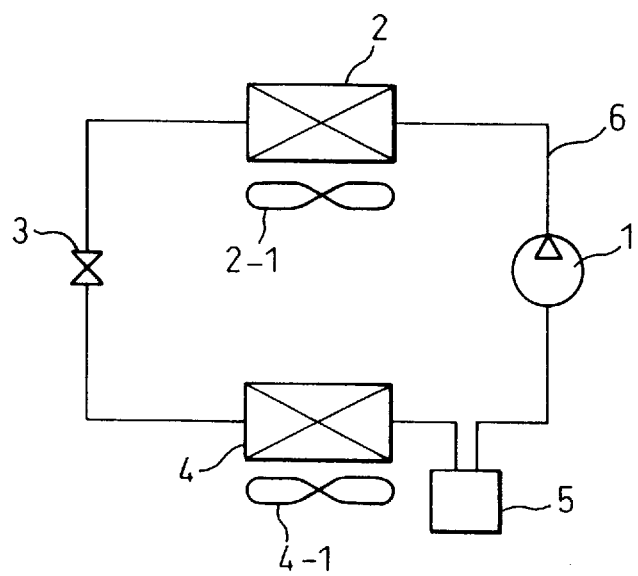
FIG. 1 is a schematic view of a refrigerating system with a pressure control valve according to a first embodiment of the present invention.

FIG. 1 schematically illustrates a refrigerating system of a vapor compression type, which is constructed by a compressor 1, a heat emitter 2, a pressure control valve (expansion valve) 3, a heat absorber (evaporator) 4 and an accumulator 5, which are connected with each other by means of pipes 6 so that a closed circuit for a refrigerant ($CO_2$) is constructed. In a well known manner, the heat emitter 2 is arranged at a front portion of the vehicle, so that a large temperature difference is obtained between the outside air contacting the heat emitter and the carbon dioxide flowing in the heat emitter, thereby enhancing heat change efficiency. Furthermore, a fan 2-1 is arranged for generating a flow of the air for an effective emission of the heat from the heat emitter. The heat absorber 4 is arranged so as to be faced with a fan 4-1, which generates an air flow contacted with the heat absorber 4 and introduced into a cabin of a vehicle. As a result, a heat exchange is occurred between the carbon dioxide under a gas-liquid combined state and the air flow, causing the air flow to be cooled due to that fact that heat corresponding to a latent heat for evaporation is removed. At the accumulator 5, in the carbon dioxide, a separation of a gaseous phase is occurred, so that a liquid phase is stored in the accumulator 5. Furthermore, the compressor 1 is connected to a drive means such an internal combustion engine or an electric motor, so that a rotating movement is transmitted to the compressor.

A refrigerating cycle as executed by the system using the carbon dioxide as the refrigerant in FIG. 1 will now be explained. Namely, in a Mollier chart in FIG. 2, an abscissa shows an enthalpy, while ordinate shows a pressure of the refrigerant. A curve SL is a saturated line on which the refrigerant is under a equilibrium condition. At the inlet of the compressor 1, the carbon dioxide is under a state designated by a point A in the Mollier chart in FIG. 2. Then, the gaseous state carbon dioxide is subjected to the compression at the compressor 1, so that the state of the refrigerant is moved to the one at a point B. The gaseous state carbon dioxide is subjected to a cooling at the heat emitter (gas cooler) 2, so that the emitted heat is taken by an air flow contacting the emitter, while the carbon dioxide is moved to a state designated by a point C in the Mollier chart. Then, the carbon dioxide is subjected to a pressure reduction at the pressure reducer 3, so that a gas-liquid combined state as designated by a point D in the Mollier chart is obtained. Finally, the gas-liquid combined state carbon dioxide is subjected to an evaporation at the evaporator 4, so that a flow of an air contacting with the evaporator 4 is cooled, while the carbon dioxide is moved to a gaseous state as designated by the point A for a repletion of the cycle. It should be noted that the phase change from the gaseous state to the gas-combined state occurs when the pressure of the carbon dioxide is reduced below the one on the saturating curve SL, i.e., the pressure at crossing point of the curve SL with the line CD.

Figure 2:
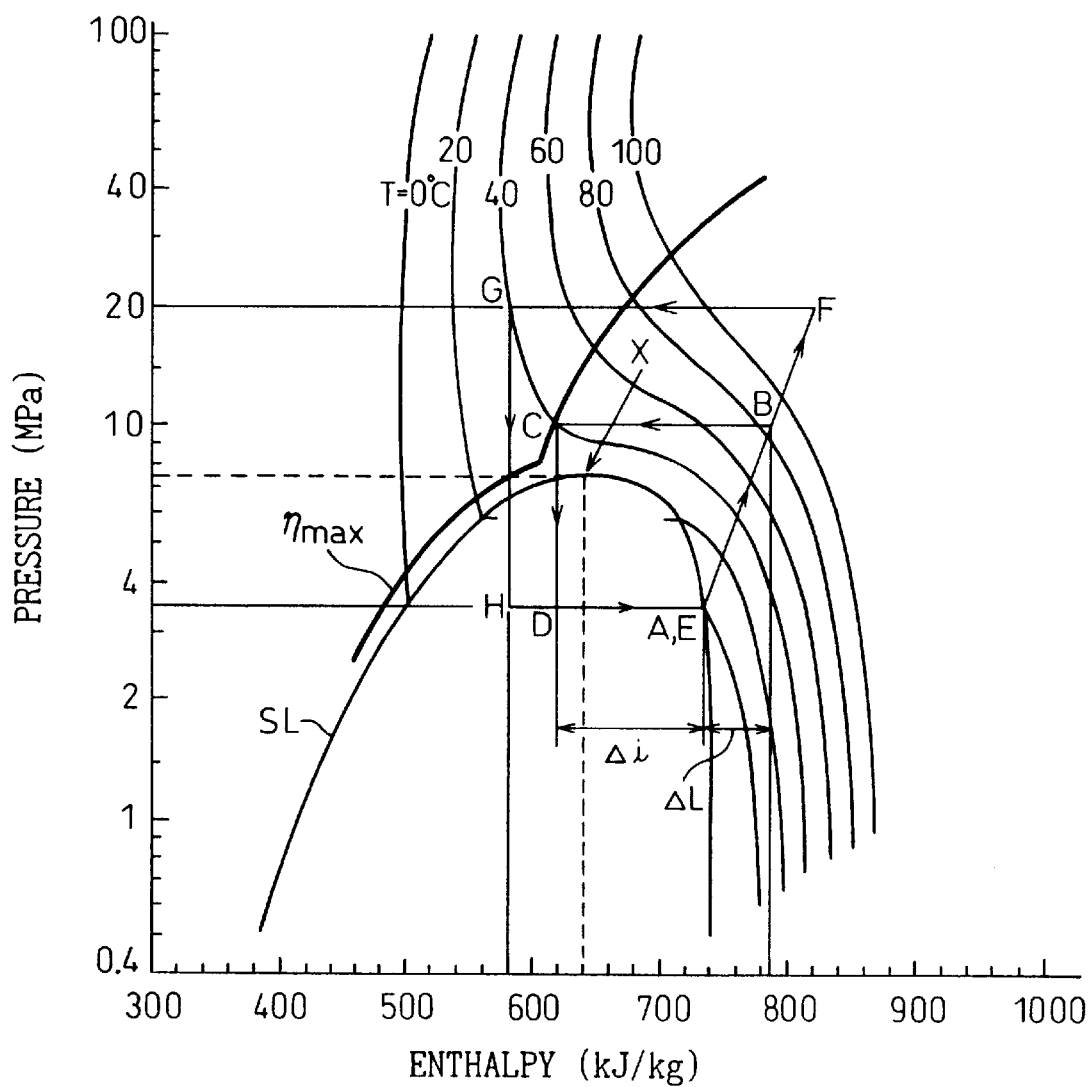
FIG. 2 is a Mollier chart of a refrigerating cycle executed by the refrigerating system using carbon dioxide as the refrigerant.

The carbon dioxide has, however, a critical temperature (a temperature at the critical point X) of about 31° C., which is lower than the critical temperature of freon, such as R12, of about 112° C. Thus, during a summer season, a situation may occur where the temperature of the carbon dioxide at the outlet of the heat emitter 2 is higher than its critical temperature, which prevents the carbon dioxide from being condensed. In other words, a crossing of the line BC with the saturation curve SL does not occur as shown in FIG. 2. In FIG. 2, curves with numerals are isothermal lines of temperature designated by the respective numerals.

Furthermore, a condition at the outlet of the heat emitter 2 as designated by the point C is determined by the outlet pressure of the compressor 1 and the temperature of the carbon dioxide at the outlet of the heat emitter 2. The temperature of the carbon dioxide at the outlet of the heat emitter 2 is determined by the heat emission capacity at the heat emitter 2 and the temperature of the outside air. It is clear that the outside air temperature is not controllable, which makes the temperature of the carbon dioxide to be uncontrollable at the outlet of the heat emitter.

In view of above, in order to control the condition at the outlet of the heat emitter designated by the point C in FIG. 2, a control of the outlet pressure of the compressor, which corresponds also to the pressure at the outlet of the heat emitter, is essential. Namely, in order to obtain a desired cooling capacity, i.e., an increased enthalpy difference under a condition of an increased outside air temperature in a summer season, it is essential that an outlet pressure of the compressor is increased to a value as designated by a point F in FIG. 2. In other words, the pressure at the outlet of the heat emitter 2 is increased to the value as designated by a point G in FIG. 2, so that the refrigerating cycle is executed in the order of E-F-G-H-E.

In order to obtain an increased pressure at the outlet of the heat emitter 2, an increase in a pressure at the outlet of the compressor 1 is necessary, which necessitates an increased work done by the compressor, which corresponds to a change $\Delta L$ in the enthalpy during the compression process. However, such an increase in the enthalpy may cause a coefficient of performance COP to be reduced in a situation that the change $\Delta L$ in the enthalpy during the compression phase from the point A to the point B is larger than an increase $\Delta i$ in the change in the enthalpy during the evaporation phase from the point D to A. The coefficient of performance COP is calculated by $\Delta i/\Delta L$.

Figure 3:
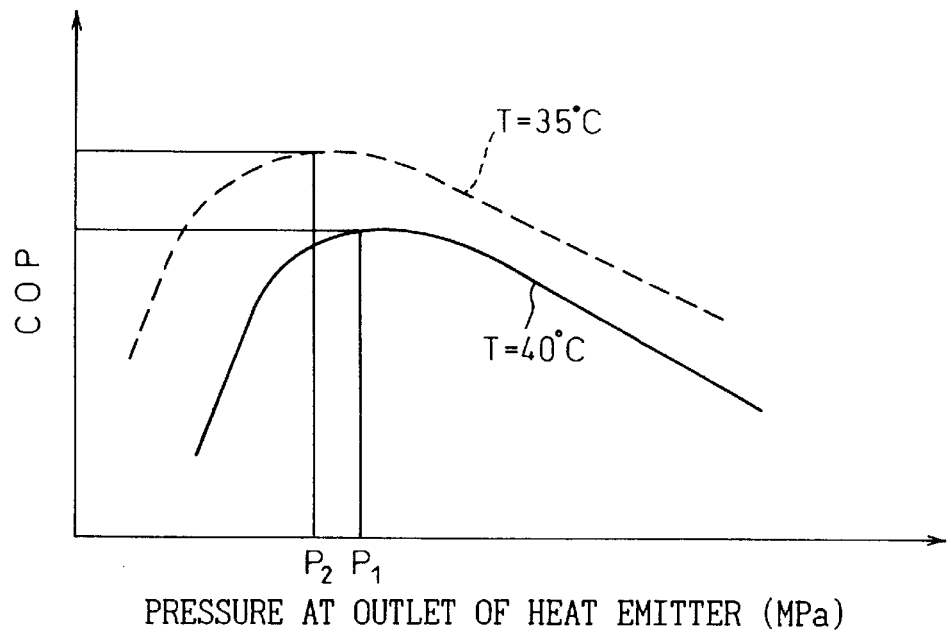
FIG. 3 is relationships between a pressure at the outlet of the heat emitter and coefficient of a performance (COP).

A result of a calculation of the COP by using the pressure of the carbon dioxide at the outlet of the heat emitter will now be explained. A solid curve in FIG. 3 shows a relationship between the pressure at the outlet of the heat emitter 2 and the value of the COP when the temperature of the carbon dioxide is 40° C. The maximum value of the COP is obtained at a pressure $P_1$ of about 10 MPa. A dotted curve in FIG. 3 shows a similar relationship when the temperature of the carbon dioxide is 35° C. The maximum value of the COP is obtained at a pressure $P_2$ of about 8.0 MPa.

The above process for obtaining the maximum value of the COP is done along the entire range of the temperature of the carbon dioxide. As a result, a curve ηmax, which is shown by a thick line in FIG. 2 and which is referred as the optimum control line hereinbelow is obtained, which makes COP the maximum value at designated conditions. In other words, in order to obtain an effective operation of the refrigerating system using carbon dioxide as the refrigerant, it is essential to provide a control means for controlling the pressure as well as the temperature of the carbon dioxide, so that they are located on the optimum control line ηmax at the outlet of the heat emitter 2.

Note: The Mollier chart in FIG. 2 is extracted from Fundamentals Handbook, published by the American Society of Heating, Refrigerating and Air-conditioning Engineers.

According to the present invention, the arrangement of the pressure control valve 3 is such that a desired control of the pressure of the carbon dioxide is done. Now, a construction of the pressure control valve 3 will be explained with reference to FIG. 4. The pressure control valve 3 includes a valve cover 10, a diaphragm 11 and a valve housing 13. The diaphragm 11 is, at its outer periphery, sandwiched between the cover 10 and the housing 13, so that a closed chamber 12 is formed above the diaphragm 11 and an opened chamber 12' is formed below the diaphragm. In the diaphragm chamber 12, the carbon dioxide is sealingly stored, while the volume of the carbon dioxide with respect to the volume of the chamber 12 as obtained at the seated state of the valve member 20 of the valve 1 is such that at a density of about 600 kg/m$^3$ of the carbon dioxide is obtained.

The valve housing 13 is located in a section 6-1 of the recirculating pipe 6, so that a chamber 14 in communication with the heat emitter 2 for receiving the carbon dioxide therefrom is formed in the section 6-1 of the pipe 6 on the upper (upstream) side of the housing 13, while a chamber 15 in communication with the heat receiver 4 for issuing the carbon dioxide thereto is formed in the section 6-1 of the pipe 6 on the lower (downstream) side of the housing 13. The valve housing 13 is formed with a central bore 13-1 and a plate 16. The housing 6 is provided with a valve port 17 opened to the lower chamber 15, and diametrically opposite pair of communication holes 18 opened to the upper chamber 14.

The pressure control valve 3 is further provided with a valve member 20, a valve spring 21 and a spacer 22. The valve member 20 has a bottom spherical end 20' facing the valve port 17 and a top end connected to the diaphragm 11 by a suitable conventional means, such as a nut (not shown). The spring 21 generates a spring force for urging the valve member 20 so that it is seated on the valve housing 13, thereby closing the valve port 17. The spacer 22 is for controlling a set force of the spring 21 to, for example, 1 MPa. Finally, an arrangement of the spacer 22 is such that the pressure at the central bore 13-1 in communication with the upper chamber 14 is opened to the lower diaphragm chamber 12'. As a result of this arrangement, a force is applied to the diaphragm 11 in accordance with the pressure difference between the upper and lower diaphragm chambers 12 and 12'. Namely, the pressure in the upper (closed) chamber 12 urges the diaphragm 11 to be moved downwardly, while the pressure in the lower chamber 12' opened to the chamber 14 urges the diaphragm 11 to be moved upwardly. Thus, the operation of the valve member 20 is controlled in accordance with the difference between the spring force and the force due to the pressure difference.

Figure 5:
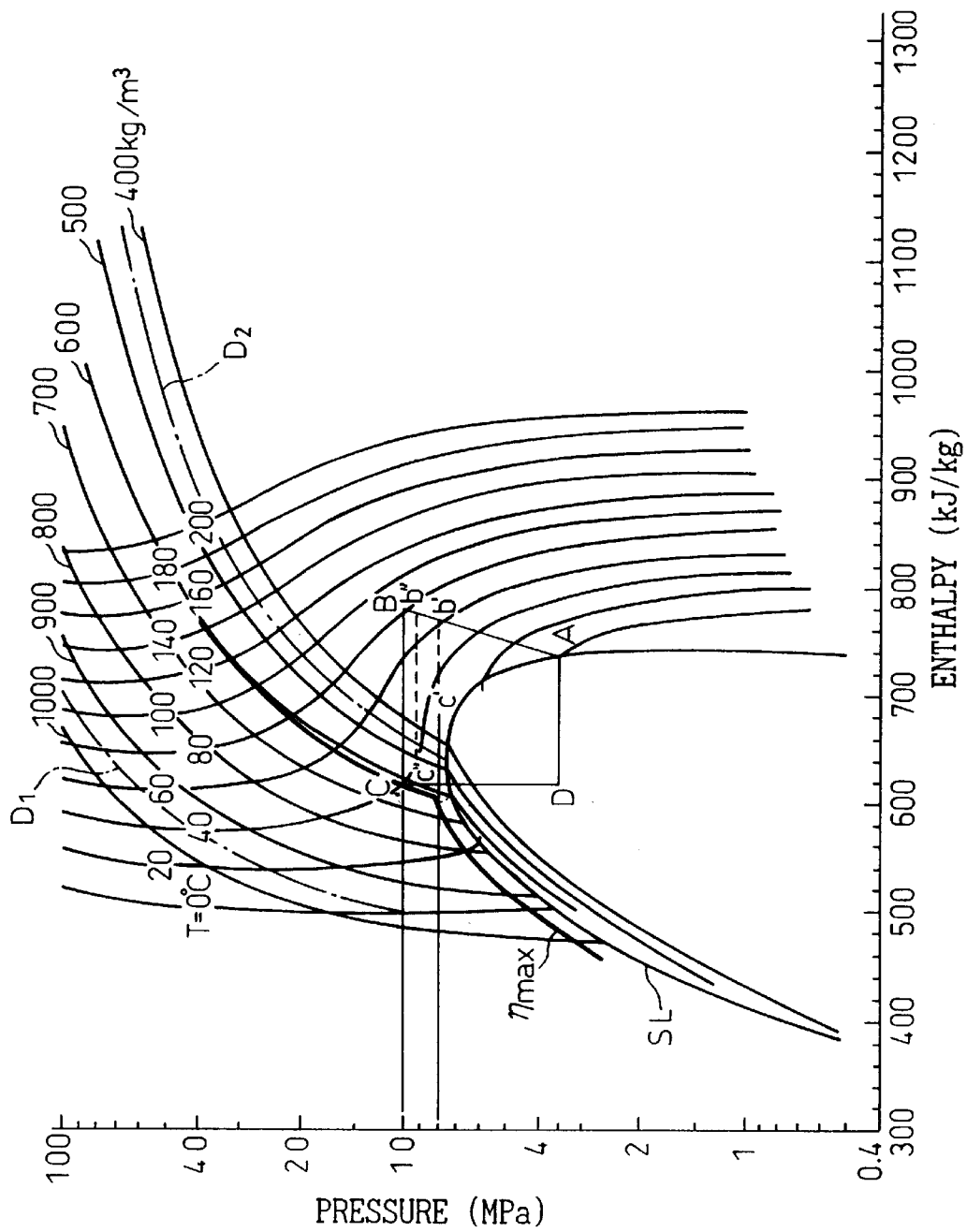
FIG. 5 is a Mollier chart, which is the same as FIG. 2 but shown with isodensity lines.

Now, an operation of the pressure control valve 3 will be explained. FIG. 5 is a Mollier chart when the carbon dioxide ($CO_2$) is used and is same as that in FIG. 2. In FIG. 5, in addition to the isothermal lines with numerals designating respective temperatures of $CO_2$, isodensity lines with numerals designating respective density of $CO_2$ are shown. In the closed upper diaphragm chamber 12, the carbon dioxide is sealingly stored at a density of 600 kg/m$^3$ when measured by the volume of the chamber 12 as obtained under the seated condition of the valve member to the valve port 17. Thus, the pressure and the temperature of the carbon dioxide in the sealed chamber 12 are varied along the isodensity line with the numeral of 600. When the temperature of $CO_2$ in the chamber 12 is, for example, 20° C., the pressure in the chamber 12 is 5.8 MPa, which is obtained as the pressure at the crossing point between the isothermal line of 20° C. and isodensity line 600 kg/m$^3$, which generates a force urging the valve member 20 to be seated on the valve seat. Furthermore, the set force of the spring 21 is about 1.0 MPa, which also generates a force urging the valve member 20 to be seated on the valve seat. In total, the valve member 20 is urged so as to be seated on the valve seat at the force of about 5.8+1.0=6.8 MPa. This means that, when the pressure inside the lower chamber 12', which urges the diaphragm 11 upwardly, i.e., the valve member 20 to be detached from the valve seat, is lower than 6.8 MPa, the valve member 20 maintains its closed position where it is seated on the valve seat, which prevents the carbon dioxide from flowing from the chamber 14 into the chamber 15. Contrary to this, when the pressure inside the chamber 12' is higher than 6.8 MPa, the diaphragm 11 is moved upwardly, which causes the valve member 20 to be detached from the valve seat, which allows the carbon dioxide to flow from the chamber 14 to the chamber 15 via the valve port 17.

In the similar way, when the temperature inside the upper (closed) space 12 is 40° C., the pressure, which is the one at the crossing point between the isothermal line of 40° C. and the isodensity line of 600 kg/m$^3$, is 9.7 MPa. Thus, the total force for moving the valve member 20 toward the valve seat is 9.7+1=10.7 MPa. As a result, a pressure of the lower diaphragm chamber 12' lower than 10.7 MPa causes the valve plate 20 to be seated on the valve seat to close off the valve port 17, while the pressure of the lower diaphragm chamber 12' higher than 10.7 MPa causes the valve plate 20 to be detached from the valve seat to open the valve port 17.

Now, an operation of the refrigerating system according to the present invention will be explained. When the system is under such a condition that, at the outlet of the heat emitter 2, the temperature is, for example, 40° C. and the pressure is lower than 10.7 MPa, the pressure control valve 3 is under the closed condition where the valve member 20 is seated on the valve seat, which prevent $CO_2$ in the upstream chamber 14 from flowing into the downstream chamber 15. As a result, the $CO_2$ stored in the accumulator 5 is "sucked" by the compressor 1, which allows the pressure at the outlet of the heat emitter 2 to be increased from the one as obtained due to a state of a change of condition from point b' to c' to the one as obtained due to a state of change from point b" to c".

When the pressure at the outlet of the heat emitter 2 exceeds 10.7 MPa, i.e., a change of the state from point B to C in FIG. 5 occurs, the diaphragm 11 is displaced upwardly and the valve member 20 is moved upwardly from the valve seat against the force of the spring 21, thereby allowing $CO_2$ in the upstream chamber 14 to flow into the downstream chamber 15. The $CO_2$ is subjected to an evaporation at the evaporator 4, while the air flow contacting the evaporator 4 is subjected to cooling. The $CO_2$ is returned into the accumulator 5, which causes the pressure to be reduced below 10.7 MPa at the outlet of the heat emitter 2, which causes the pressure control valve to take the closed position, again.

In short, in the operation of the system, the closure of the pressure control valve causes the pressure at the outlet of the heat emitter 2 to be increased to a predetermined value, which is followed by the reduction of the pressure of $CO_2$ and the evaporation for cooling the air.

In case where the temperature at the outlet of the heat emitter 2 is, for example, 20° C., the pressure control valve is under a closed condition when the pressure at the outlet of the heat emitter 2 is lower than about 6.8 MPa. When the pressure at the outlet of the heat emitter exceeds the value of about 6.8 MPa causes the pressure control valve to be opened.

Figure 4:
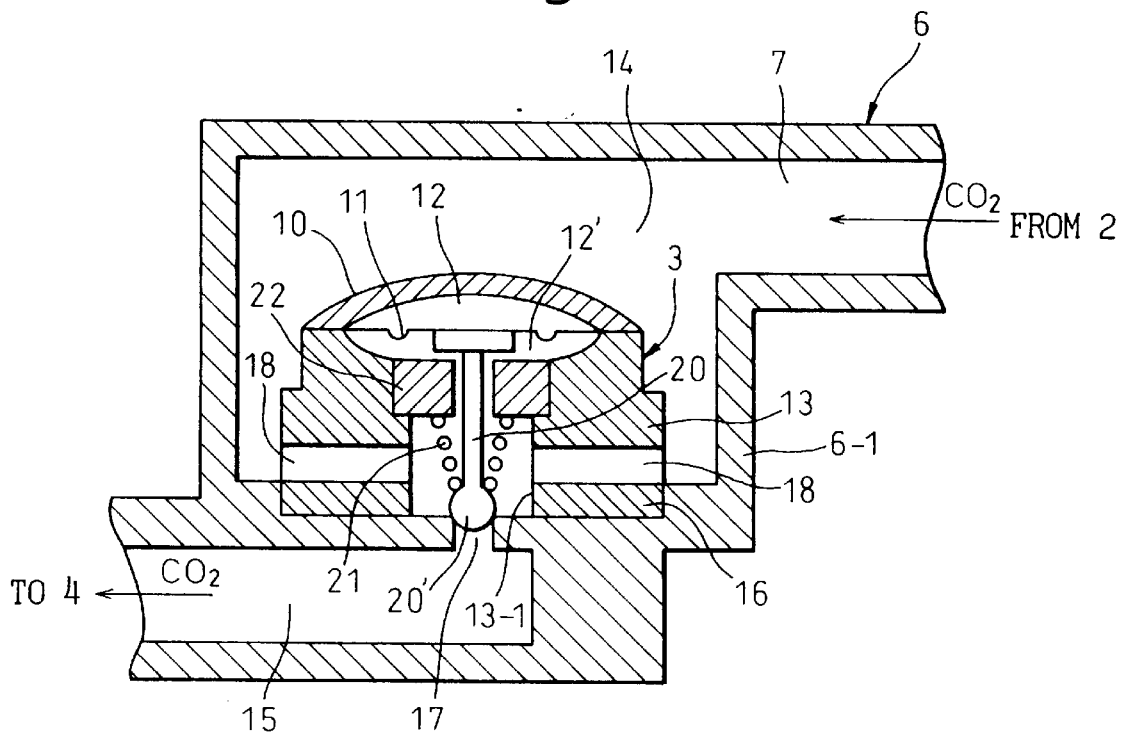
FIG. 4 is a cross sectional view of the pressure control valve in FIG. 1.

The pressure control valve in the embodiment in FIG. 4 has an operating characteristic such that it is opened when the pressure at the outlet of the heat emitter 2 is increased to a predetermined value. The operating characteristic is determined in accordance with the pressure characteristic at the sealed chamber 12 of the pressure control valve. As will be appreciated from FIGS. 1 and 4, the isodensity curve at 600 kg/m$^3$ in the super critical area substantially conforms with the optimum control line ηmax. Thus, the pressure control valve in FIG. 4 operates to control the pressure along the optimum control line ηmax, so that an increased efficiency of execution of the refrigerating cycle is obtained by means of the refrigerating system.

In the condensed area below the pressure at the critical point (X) in FIG. 2, a deviation of the isodensity line of 600 kg/m$^3$ from the optimum control line ηmax is increased. However, in the condensed area, the pressure inside the chamber 12 is located adjacent the saturated line SL. However, a set force applied to the valve member 20 by the coil spring 21 allows the system to be controlled to a super cooled condition (subcool condition) of about 10° C., which allows the system to be operated under a high efficiency even at a region of a pressure below the critical pressure.

Figure 6:
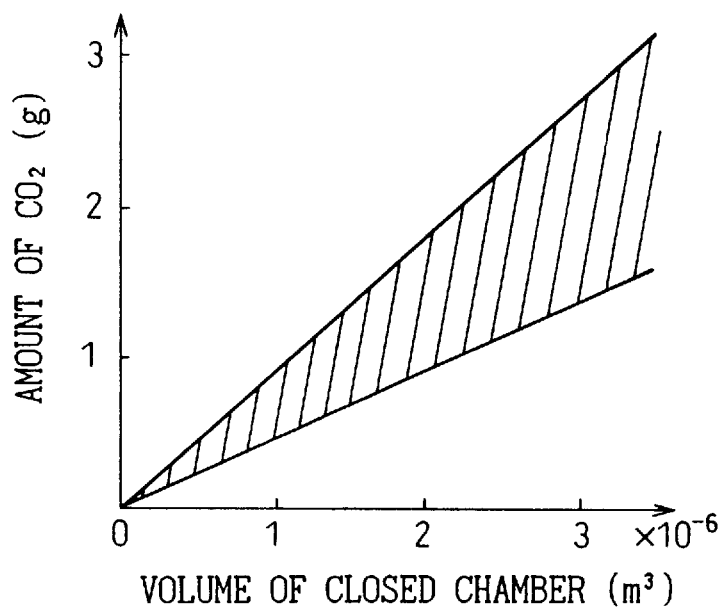
FIG. 6 shows relationships between the volume of the closed chamber and an amount of carbon dioxide in the closed chamber.

From the practical view point, it is desirable that the sealing of the $CO_2$ in the chamber 12 is such that the density of the $CO_2$ is in a range between the density of the saturated liquid $CO_2$ when the temperature is 0° C. and the density of the saturated liquid of $CO_2$ when the temperature is that of $CO_2$ at the critical point. In particular, it is desirable that the density is in a range between the isodensity line $D_2$ of 450 kg/m$^3$ and the isodensity line $D_1$ of 950 kg/m$^3$. This range of the density of $CO_2$ corresponds to the shaded area of the amount of $CO_2$ in FIG. 6, which shows relationships between the volume of the sealed chamber 12 and the amount of the sealed $CO_2$.

As will be understood from the operation of the pressure control valve, it is desirable that, in response to the temperature at the outlet of the heat emitter 2, i.e., the temperature in the space 14, the temperature in the chamber 12 varies without delay. Thus, it is desirable that the valve cover 10 and the valve housing 13 are made from a material of an increased heat conductivity for obtaining a conducted heat amount as large as possible. In view of this, according to the embodiment, the valve cover and the valve housing are made from brass, while the diaphragm 11, the valve member 20 and the coil spring 21 are made from a stainless steel.

Finally, in the first embodiment, the valve cover 10 is advantageously formed with fins or a recess for increasing a heat transfer coefficient between the carbon dioxide in the space 14 and the valve cover 10.

Second Embodiment

Figure 7:
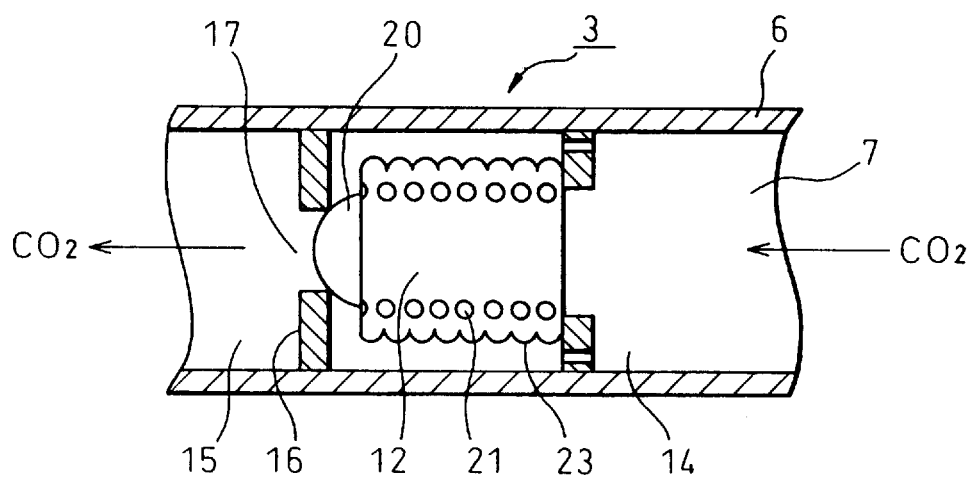
FIG. 7 is a cross sectional view of a pressure control valve in a second embodiment.

FIG. 7 shows a modification of a pressure control valve 3 including a bellows member 23, in which the carbon dioxide is sealingly stored at a predetermined density. The bellows member is made of a brass material of an increased heat conductivity. A valve member 20 is connected to the bellows member 23 so that the valve member 20 is faced with a valve port 17 of the valve seat plate 16. A spring 21 for urging the valve member 20 toward the valve seat plate 16 is arranged in the sealed chamber 12 in the bellows member. An operation of the pressure control valve 3 in FIG. 7 is similar to that of the pressure control valve 3 in FIG. 4. Namely, a force due to the pressure of $CO_2$ stored in the chamber 12 plus the force of the spring 21 urges the valve member 20 to be seated on the valve seat 16. Contrary to this, the pressure of $CO_2$ in the conduit section 6 causes the valve member 20 to be detached from the valve seat 16. As a result, the pressure of the $CO_2$ in the conduit 6 is controlled to the pressure of the $CO_2$ in the chamber 12 plus the set force of the spring 21, as similar to the first embodiment in FIG. 4.

Third Embodiment

Figure 8:
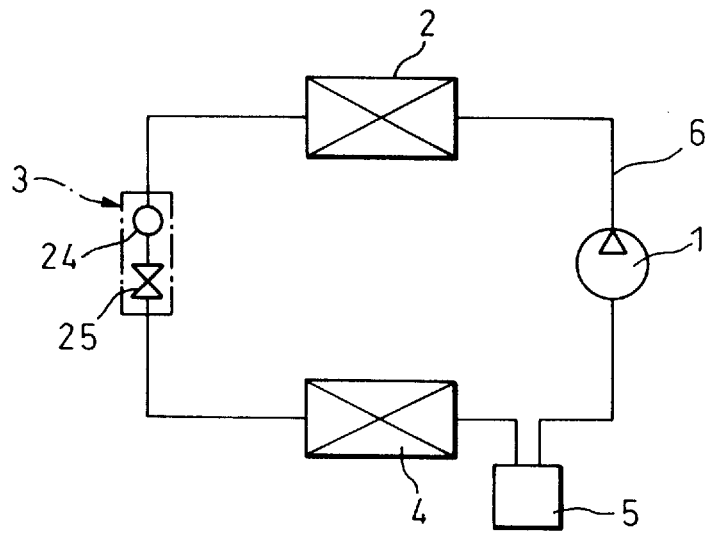
FIG. 8 is a schematic view of a refrigerating system in a third embodiment.

A third embodiment of the present invention is directed to a provision of a pressure control valve 3, which is electrically operated. Namely, as shown in FIG. 8, the pressure control valve 3 is constructed essentially by a sensor 24 for detecting a difference of the pressure of the recirculated carbon dioxide from the sealed reference pressure and an electrically operated expansion valve 25 which is operated by an electrically operating signal. It is desirable that the sensor section 24 is at a location on one side of the expansion valve 25 adjacent to the heat emitter 2.

Figure 9:
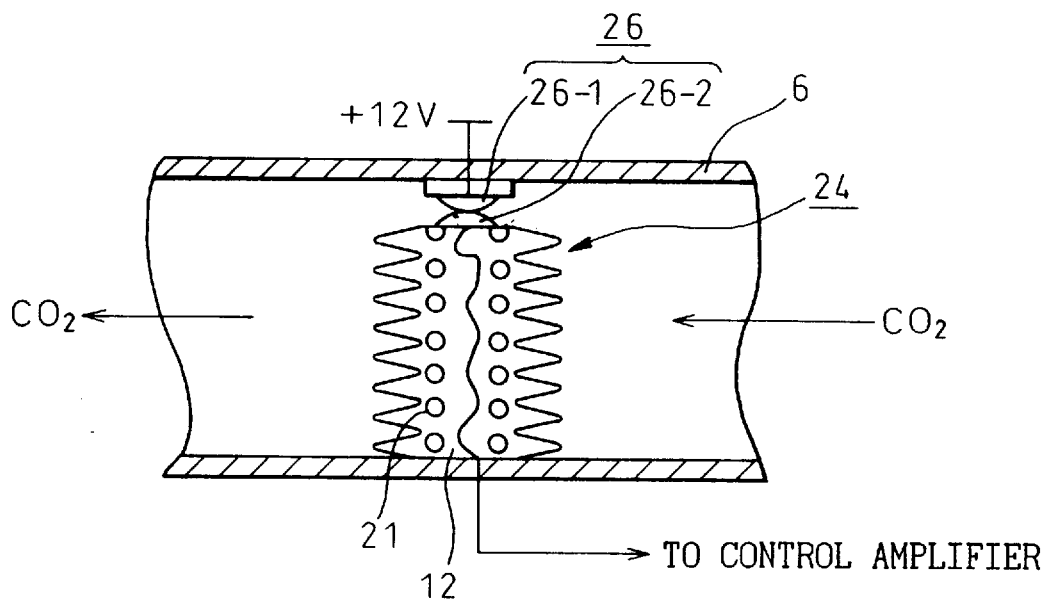
FIG. 9 is a cross sectional view of a pressure switch in a pressure control valve in FIG. 8.

FIG. 9 shows a construction of the sensor part. Namely, the sensor section 24 includes a bellows 23 in which the carbon dioxide is sealingly stored at a predetermined density and a contact unit 26 constructed by a stationary contact 26-1 fixedly connected to the conduit 6 and a movable contact 26-2 connected to the bellows member 23 to face the stationary contact 26-1. The contact unit 26 is for controlling the operation of the expansion valve 25 via an amplifier (not shown). A pressure of $CO_2$ in the chamber 14 lower than the pressure in the sealed chamber 12 inside the bellows member 23 plus the set force of the spring 21 causes the bellows 23 to be inflated, thereby causing the contacts 26-1 and 26-2 to contact each other. As a result, the expansion valve 25 is controlled so that it is closed, thereby increasing the pressure at a location upstream from the pressure control valve 3. Contrary to this, a pressure of $CO_2$ at the location upstream from the pressure control valve higher than the pressure in the sealed chamber 12 inside the bellows member 23 plus the set force of the spring 21 causes the bellows 23 to be deflated, thereby causing the contacts 26-1 and 26-2 to be detached from each other. As a result, the expansion valve 25 is controlled so that it is opened, thereby reducing the pressure at the location upstream from the pressure control valve.

In the above embodiments, the spring 21 is used for generating an initial set force. However, in place of the spring 21, an elastic force of the diaphragm or bellows can be used for generating the initial set force.

Furthermore, in place of the coil spring, a non-condensable gas together with the refrigerant ($CO_2$) can be sealed in the space 12.

Furthermore, an integral structure of the pressure control valve with the heat emitter can be employed.

Fourth Embodiment

A fourth embodiment is directed to a detection of the pressure as well as the temperature of the refrigerant at the outlet of the heat emitter 2 and a control of the outlet pressure by using these detected values.

Figure 10:
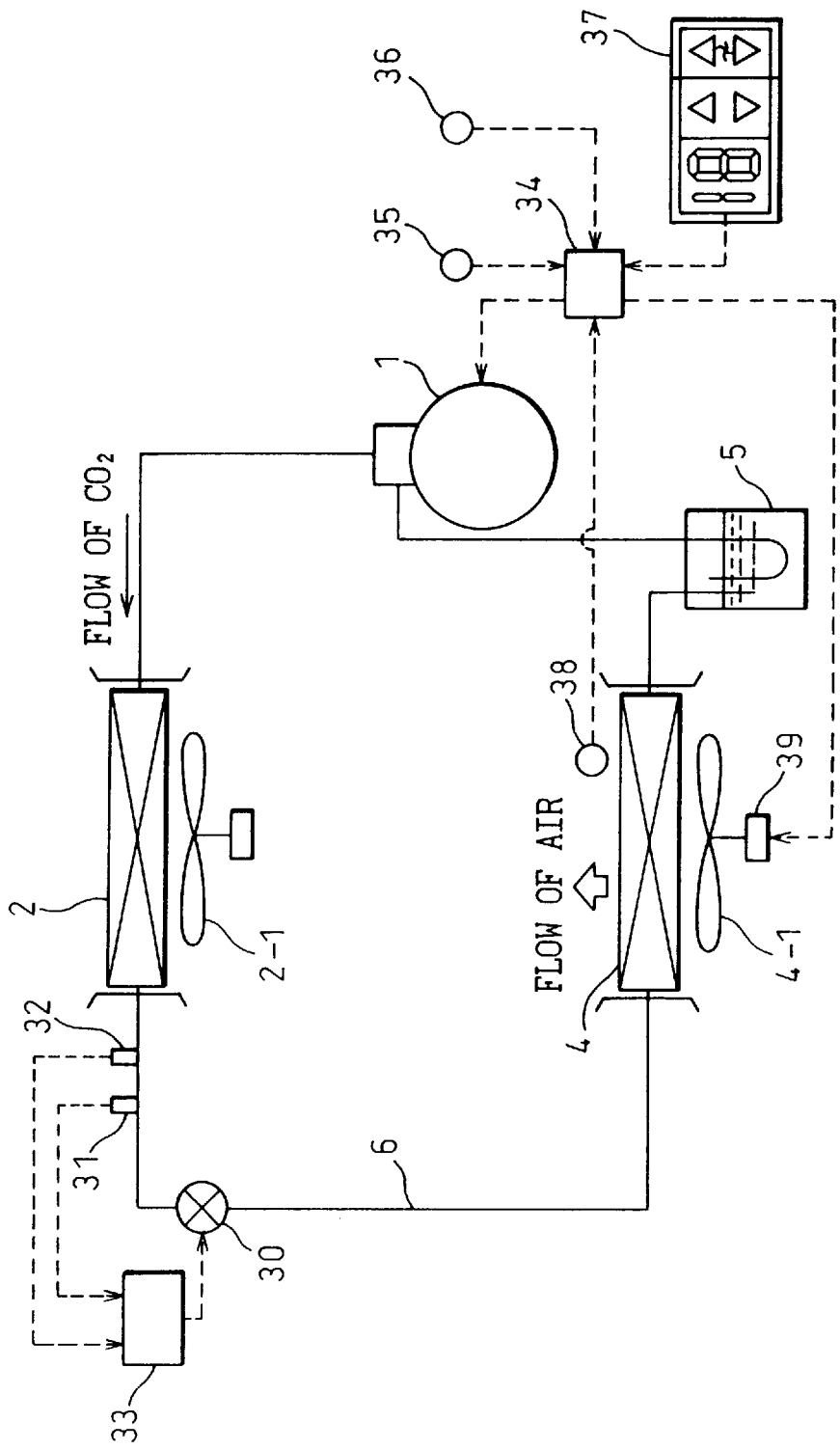
FIG. 10 is a schematic view of a refrigerating system in fourth embodiment with an electrically operated pressure control valve.
Figure 11:
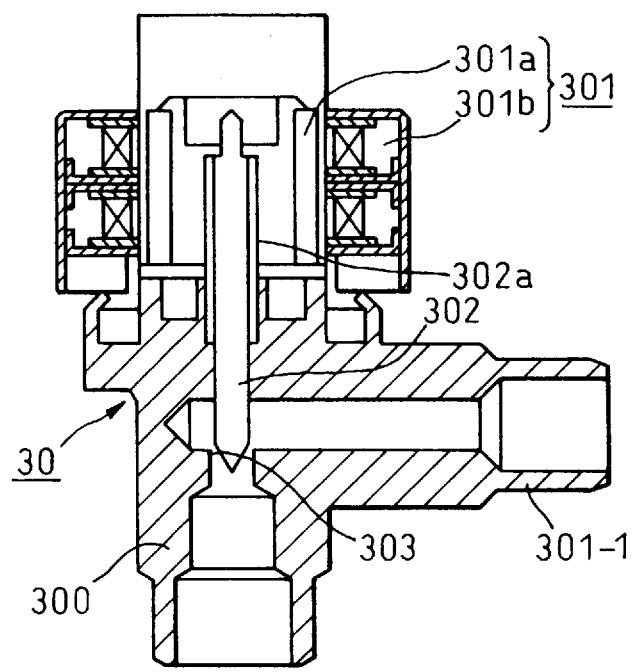
FIG. 11 is a cross sectional view of a pressure control valve in FIG. 10.

In FIG. 10, which shows an entire refrigerating system, an electric operated pressure control valve 30 is arranged on the closed conduit 6. As shown in FIG. 11, the pressure control valve 30 is constructed by a valve casing 300, a stepping motor 301, a rod shaped valve member 302 and a valve port 303. The stepping motor 301 includes a rotor (armature) 301a and a stator 301b. The rotor 301a is engaged with the valve member 302 at its screw portion 302a, while the rod shaped valve member 302 is in a spline engagement with the valve casing 300. As a result, a rotating movement of the rotor 301a of the stepping motor 301 is transmitted to the longitudinal or vertical movement of the valve member. As a result, a position of the valve member 302 with reference to the valve port 303, i.e., the degree of the throttling of the valve port 303 is varied in a continuous manner from a fully closed state to a fully opened state.

As shown in FIG. 10, at the outlet of the heat emitter 2, a temperature sensor 31 for detecting a temperature of the refrigerant at the outlet of the heat emitter 2 and a pressure sensor 32 for detecting a pressure of the refrigerant at the outlet of the heat emitter 2 are provided. A control unit 33 is provided for receiving the detecting signals from the sensors 31 and 32. Furthermore, the control unit 33 is for controlling the degree of the opening of the electric operated pressure control valve 30 in accordance with the detecting signal of from the temperature sensor 31. Namely, the control unit 33 is constructed as a microcomputer unit having a central processing unit (CPU), a random access memory (RAM) and a read only memory (ROM), which are not shown. In a well known manner, the ROM includes relationships (maps) between the temperature and the pressure, corresponding to the optimum control line ηmax in FIGS. 2 and 5.

It should be noted that the optimum control line ηmax is determined not only by the temperature and the pressure of the refrigerant at the outlet of the heat emitter 2 but also by a change in the pressure at the evaporator 4. However, the latter change in the pressure at the evaporator 4 can be negated in the air conditioning system using the carbon dioxide, where only the cooling operation is done. Thus, except for a sixth embodiment, which will be explained later, a calculation of the optimum control line ηmax is done while a presumption is taken that the pressure at the evaporator 4 is constant.

Figure 12:
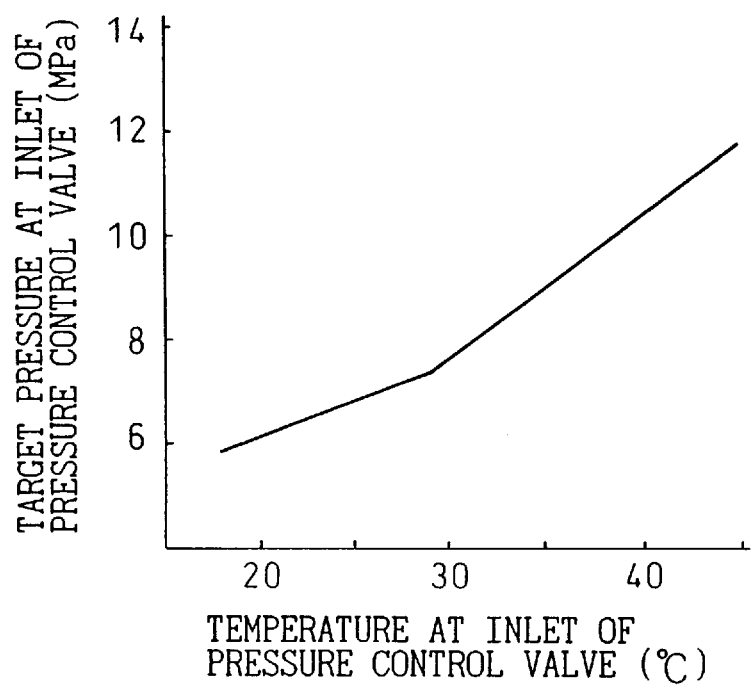
FIG. 12 is a relationship between a temperature at the inlet of the pressure control valve and a target value of the pressure at the inlet of the pressure control valve.

According to various tests by the inventors, it was found that, in order to increase the coefficient of a performance during the execution of the operating cycle using $CO_2$, it is desirable that the degree of super cooling (sub-cool) at the inlet of the pressure control valve 3 or 30 is in a range between 1° C. to 10° C. FIG. 12 is the optimum control line ηmax which is expressed by a orthogonal system when the pressure in the evaporator 4 is about 3.5 MPa corresponding to 0° C. at the evaporator 4 and the degree of the super cooling is about 3° C.

Furthermore, in the fourth embodiment in FIG. 10, a control unit 34 is further provided for controlling a rotating speed of an electric motor (not shown) for operating the compressor 1. The control unit 34 is fed by signals from a temperature sensor 35 for detecting a temperature of the air inside a cabin of the vehicle, a temperature sensor 36 for detecting a temperature of the air outside the cabin and a temperature sensor 38 arranged at a location downstream from the evaporator (cooler) 4 in the direction of a flow of air after contacted with the evaporator 4. A setter 37, which is manipulated by a driver or a passenger, is also connected to the control unit 34, so that signals indicating a set temperature and a set air flow amount are introduced into the control unit 34, thereby obtaining a desired operation of the electric motor (not shown) for operating the compressor 1. Finally, the control unit 34 is also used to generate a signal directed to an electric motor 39 for operating the fan 4-1 of the evaporator 4, so that a control of the fan 4-1 is done in accordance with the set temperature and amount set by a passenger.

Now, an operation of the above embodiment will be explained with reference to a flow chart in FIG. 13. A start switch (not shown) is operated, which causes the compressor 1 to be rotated, thereby commencing execution of the refrigerating operation using $CO_2$. At step 100 in FIG. 13, a detected value of the temperature at the outlet of the heat emitter 2, i.e., at the inlet of the pressure control valve 30 by the temperature sensor 31 is read out. At step 110, a calculation of a target pressure at the inlet of the pressure control valve 30 is done. Namely, as explained above, the control unit 33 has a map between the temperature at the inlet of the pressure control valve 30 and the target pressure at the inlet of the pressure control valve 30, as shown in FIG. 12. A well known interpolation is done for calculating a value of the target pressure corresponding to the detected inlet temperature.

At step 120, a detected value of the pressure at the inlet of the pressure control valve 30 by the pressure sensor 32 is read out. Then, at step 130, a determination is done if the target value of the pressure at the inlet of the pressure control valve 30 calculated at the step 110 is larger than the actual value of the inlet pressure detected by the sensor 31. When a determination is obtained that the target inlet pressure is larger than the actual inlet pressure (a yes result at step 130), the routine goes to step 140, where a signal is issued to the pressure control valve 30, so that a control of the stepping motor 30 is done by which the control valve 302 is moved toward the valve port 303 for reducing a degree of the opening of the valve port 303, thereby causing the pressure to be increased at the inlet 301-1 of the pressure control valve 30.

Contrary to this, when a determination is obtained that the target inlet pressure is equal to or smaller than the actual inlet pressure (no result at step 130), the routine goes to step 150, where a signal is issued to the pressure control valve 30, so that a control of the stepping motor 30 is done by which the control valve 302 is moved away from the valve port 303 for increasing a degree of the opening of the valve port 303, thereby causing the pressure to be reduced at the inlet 301-1 of the pressure control valve 30.

As a result of the above mentioned feedback control executed by the routine in FIG. 13, a control of the relationship between the temperature and the pressure of the refrigerant at the inlet of the pressure control valve 30 as shown in FIG. 12 is obtained, which allow the refrigerating system using $CO_2$ to be operated under a high efficiency in the ultra-critical area as well as in the area below the ultra-critical area.

Fifth Embodiment

Figure 14:
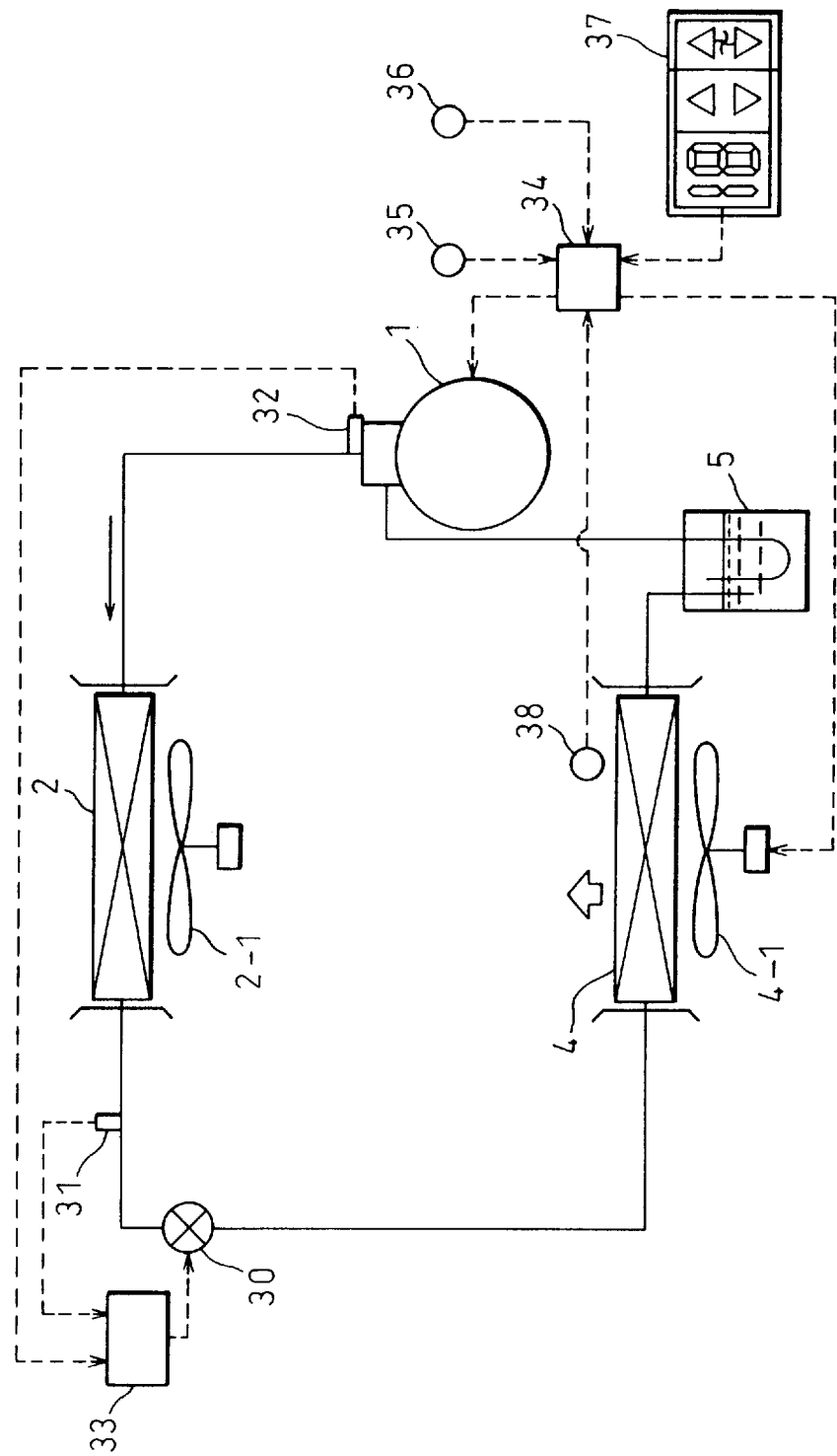
FIG. 14 is a schematic view of a refrigerating system in fifth embodiment of the present invention.

In the fifth embodiment shown in FIG. 14, the pressure sensor 32 is located at an outlet of the compressor. This arrangement allows the highest values of the pressure in the total refrigerating system of the carbon dioxide to be detected. As a result, a quick detection of an abnormal increase in the system becomes possible. Thus, an increased safety of the system executing a refrigerating cycle using the carbon dioxide is obtained.

In the operation of the fifth embodiment, the pressure sensor 32 detects the pressure at the outlet of the compressor 1. A pressure loss in the refrigerating system from the pressure sensor 32 to the outlet of the pressure emitter is calculated. A pressure at the inlet of the pressure control valve 30 is calculated as the detected pressure by the sensor 32 at the outlet of the compressor 1 minus the calculated pressure loss. The calculated pressure at the inlet of the pressure control valve 30 is used for controlling the degree of the opening of the pressure control valve 32 in the similar way in the fourth embodiment as explained with reference to FIG. 13.

Sixth Embodiment

This embodiment is directed to an application of the idea of the present invention to a well known heat pump system where a heating operation and a cooling operation is selectively switched. In a well known manner, this embodiment includes a switching valve 42 which has a first position (cooler position), where a flow of the refrigerant is obtained in the order of the compressor 1, an outside heat exchanger 2 as a heat emitter, the pressure control valve 30, an inside heat exchanger 4 as an evaporator (cooler), and the compressor 1, as shown by arrows in FIG. 15A and a second position (heater position), where a flow of the refrigerant is obtained in the order of the compressor 1, an inside heat exchanger 4 as a heat emitter, the pressure control valve 30, an outside heat exchanger 2 as an evaporator, and the compressor 1, as shown by arrows in FIG. 15B.

In the heat pump system where a switching is possible between a heating and cooling operation, unlike the pure cooling system, a determination of the outlet pressure at the outlet of the heat emitter for the maximum coefficient of performance when executing the refrigerating cycle using $CO_2$ cannot be obtained only by the temperature of the $CO_2$ at the outlet of the heat emitter due to an increased change in the pressure at the evaporator of the heat pump system over the pure cooling system. In view of this, in the instant embodiment, in addition to the temperature sensor 31 and the pressure sensor 32 on one side of the pressure control valve 30, another pair of a temperature sensor 31a and the pressure sensor 32a are arranged at the other side of the pressure control valve 30. These signals from the sensors 31 and 31a and 32 and 32a are introduced into the control circuit 33 for controlling the operation of the pressure control valve.

The operation of the sixth embodiment is as follows. During the cooling mode as shown in FIG. 15A, based on a relationship between the temperature and the pressure for a particular pressure at the evaporator 4 as shown in FIG. 16 stored in a ROM in the control unit 33, a calculation of a target value of the pressure at the inlet of the pressure control valve 30 is done. Namely, a desired relationship (map) as shown in FIG. 16 between the temperature and the pressure is selected in accordance with the pressure detected by the pressure sensor 32a, i.e., pressure at the inside heat exchanger 4 functioning as the evaporator. Then, using the selected map, an interpolation for calculating a value of the target pressure corresponding to the temperature detected by the temperature sensor 31 is done. Then, the pressure detected by the sensor 32 is compared with the calculated target pressure, so that the degree of the opening of the electric operated pressure control valve 30 in the similar way as explained with reference to FIGS. 10 and 13.

During the heating mode as shown in FIG. 15B, a similar calculation of a target value of the pressure at the inlet of the pressure control valve 30 is done. Namely, a desired map as shown in FIG. 16 between the temperature and the pressure is selected in accordance with the pressure detected by the pressure sensor 32, i.e., pressure at the outside heat exchanger 2 functioning as the evaporator. Then, using the selected map, an interpolation for calculating a value of the target pressure corresponding to the temperature detected by the temperature sensor 31a is done. Then, the pressure detected by the sensor 32a is compared with the calculated target pressure, so that the degree of the opening of the electric operated pressure control valve 30.

In FIG. 16, a curve A shows a relationship (map) between the inlet temperature and the target pressure under 2.0 MPa of the pressure (−20° C. of the temperature) in the evaporator, while curve B shows a map between the inlet temperature and the target pressure under 3.5 MPa of the pressure (0° C. of the temperature) in the evaporator. A value of the pressure at the evaporator is varied in a range which determined in accordance with various conditions such as design of the refrigerating system executing the refrigerating cycle using $CO_2$.

Seventh Embodiment

Figure 17:
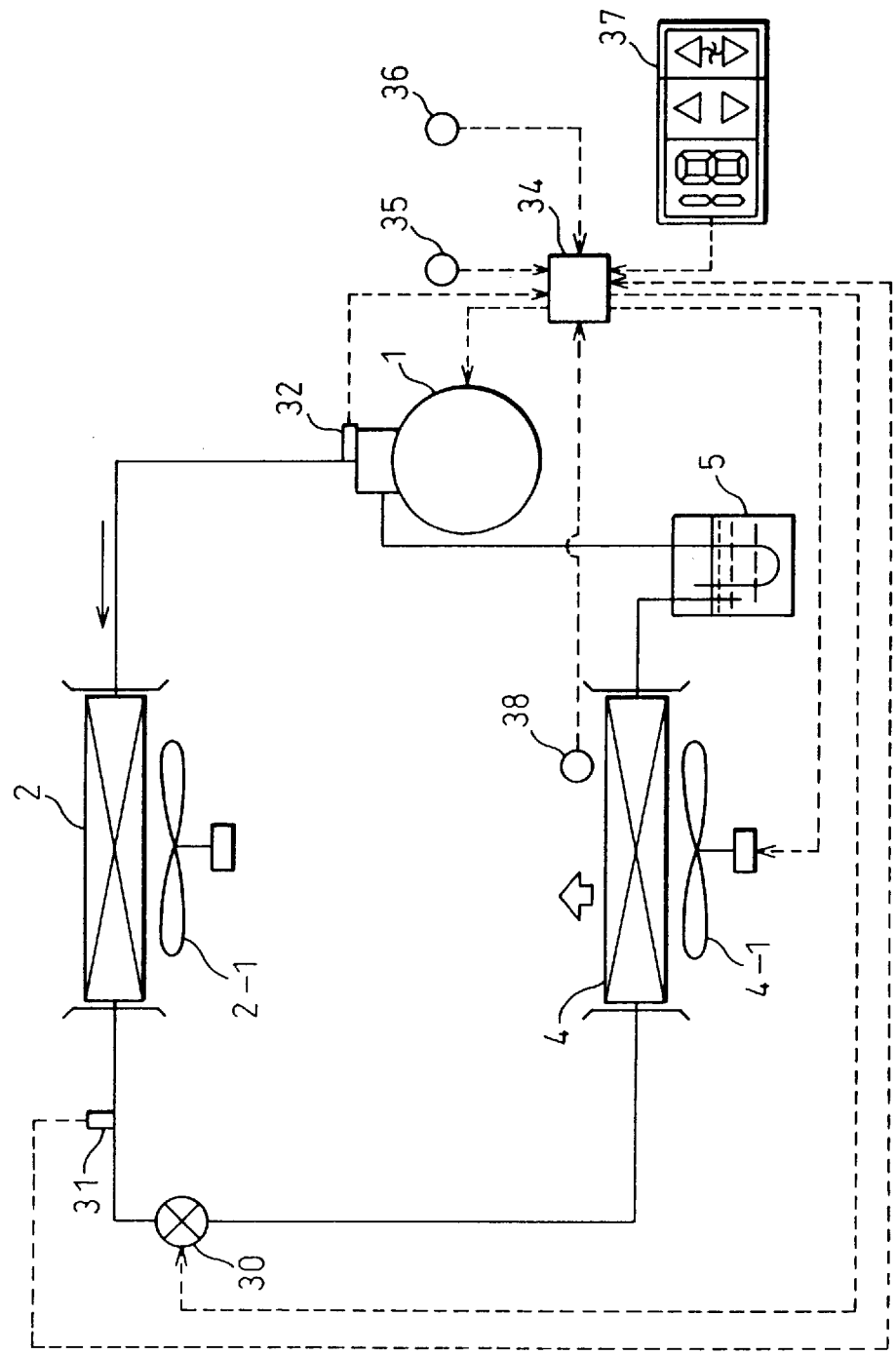
FIG. 17 is a schematic view of a refrigerating system according to a seventh embodiment present invention.

FIG. 17 shows a seventh embodiment having a control unit 34 to which the function of the control unit 33 (FIG. 10) for controlling the pressure control valve is integrated.

The operation of the seventh embodiment will be explained with reference to a flow chart in FIG. 18. The routine enters into an execution when a start switch (not shown) is depressed for causing a cooling operation to be started. At step 200, a calculation of a target value of the temperature inside the cabin is done based on the inside air temperature from the sensor 35, the outside air temperature from the sensor 36 and the set temperature from the setter 37 manipulated by a driver or a passenger. At step 210, the degree of the opening of the pressure control valve 30 is set to an initial value. At step 220, the blower 4-1 is brought into an operation, so that an operation of the blower 4-1 is commenced, resulting in a generation of a flow of the air to be contacted with the evaporator 4, which allows the cooled air flow to be issued into a cabin. Furthermore, at step 230, the compressor 1 is brought into an operation.

Step 240 to 270 are a section of the flowchart for controlling the compressor. Namely, at step 240, a signal from the sensor 38 is read out, which indicates a temperature of the air contacted with the evaporator 4 and discharged to the cabin. Then, at step 250, a determination is done if the actual discharged air temperature read out at step 240 is larger than the target discharged air temperature calculated at step 200. When it is determined that the actual discharged air temperature is higher than the target discharged air temperature (yes at step 250), the routine goes to step 260, where the control unit 34 issues a signal for increasing the rotational speed of the compressor 1. Contrary to this, when it is determined that the actual discharged air temperature is equal to or lower than the target discharged air temperature (no at step 250), the routine goes to step 270, where the control unit 34 issues a signal for decreasing the rotational speed of the compressor 1.

Figure 13:
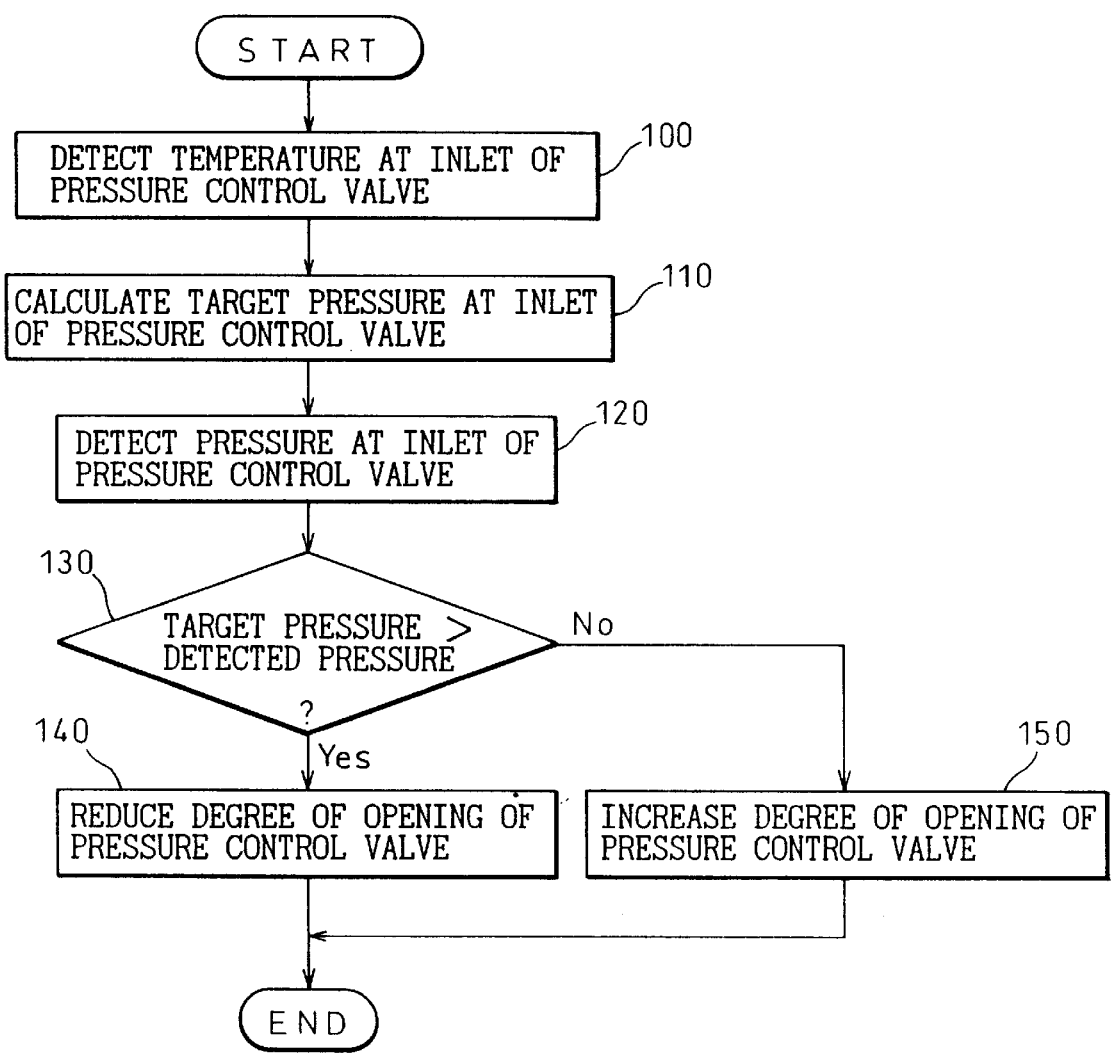
FIG. 13 is a flowchart illustrating an operation of the fourth embodiment.

Steps 280 to 330 are a section of the flow chart for controlling the pressure control valve and are similar to steps 100 to 150 in FIG. 13. Namely, at step 280, a temperature at the inlet of the pressure control valve 30 by the sensor 31 is read out. At step 290, a calculation of a target pressure at the inlet of the pressure control valve 30 is done. At step 300, detected value of the pressure at the inlet of the pressure control valve 30 by the pressure sensor 32 is read out. At step 310, a determination is done if the target value of the pressure at the inlet of the pressure control valve 30 is larger than the actual value of the inlet pressure which is the pressure detected by the sensor 31 minus a calculated pressure loss at the heat emitter. A result of the determination of the target inlet pressure larger than the actual inlet pressure causes the routine go to step 320, where a degree of the opening of the control valve 302 is reduced. Contrary to this, a result of the determination of the target inlet pressure equal to or smaller than the actual inlet pressure causes the routine go to step 330, where the degree of the opening of pressure control valve 30 is increased.

The present invention is not necessarily limited to an application to a refrigerating system using carbon dioxide and is also applied to a refrigerating system of vapor compression type using a refrigerant operating at a super critical area, such as an ethylene, ethane, or nitrogen oxide et al.

Furthermore, the refrigerating system can eliminate an accumulator. In this case, a sucking of the refrigerant ($CO_2$) remaining in the evaporator can take place, thereby obtaining the same operation as that by the refrigerating system having an accumulator.

We claim:

1. A pressure control valve for use in a passageway for a refrigerant of a vapor compression type refrigerating system having, in addition to the pressure control valve, a compressor, a heat emitter, and an evaporator, said pressure control valve being arranged at a location between the heat emitter and the evaporator, said pressure control valve comprising:

a partition wall for dividing said passageway into an upstream chamber for receiving the refrigerant from the heat emitter and a downstream chamber for issuing the refrigerant to the evaporator;

said partition wall defining a valve port located between the upstream and downstream chambers;

a deflector having a sealingly closed chamber therein and performing deflection in response to a pressure difference between said sealingly closed chamber and the upstream chamber; and a valve member for controlling a communication of the upstream chamber with the downstream chamber via said valve port;

said deflector commencing said deflection when a pressure at the upstream chamber is higher than a pressure in the sealingly closed chamber by a predetermined value;

said deflector being connected to said valve member in such a manner that the commencing of the deflection of the deflector causes the valve member to be detached from the valve port;

wherein said refrigerant is carbon dioxide; and said refrigerant being filled to a volume of said sealingly closed chamber as obtained when said valve member closes said valve port at a density in a range between 450 kg/m$^3$ and 950 kg/m$^3$.

2. A pressure control valve according to claim 1, wherein said deflector comprises a diaphragm connected to the valve member, a casing for storing therein the diaphragm so that the sealingly closed chamber is formed on one side of the diaphragm, while the diaphragm being opened to the upstream chamber on the side remote from the sealingly closed chamber and a spring for urging the valve member so that the latter closes the valve port.

3. A pressure control valve according to claim 1, wherein said deflector comprises a bellows having a chamber therein as said sealingly closed chamber and connected to said valve member, a support member for making the bellows to be stationary at the end opposite the valve member and a spring for urging the valve member so that the latter closes the valve port.

4. A pressure control valve according to claim 1, wherein said valve member is of an electrically operated type, and wherein said deflector comprises a bellows member defining therein a chamber as said sealingly closed chamber, a movable contact connected to the bellows member, a stationary contact faced with the movable contact, and a spring for urging the contacts to be contacted with each other, thereby generating an electric signal for causing the valve member to close the valve port, the pressure of the upstream chamber higher than that in the sealingly closed chamber causing the movable contact to be detached from the stationary contact, causing the valve member to open the valve port.

5. A refrigerating system comprising:

a passageway for a refrigerant;

a compressor for compressing the refrigerant;

a heat emitter for cooling the refrigerant compressed at the compressor;

a pressure control valve for reducing the pressure of the refrigerant at an outlet of said heat emitter; and an evaporator for evaporating the refrigerant of the reduced pressure from the pressure control valve;

said pressure control valve comprising:

a partition wall for dividing said passageway into an upstream chamber for receiving the refrigerant from the heat emitter and a downstream chamber for issuing the refrigerant to the evaporator;

said partition wall defining a valve port located between the upstream and downstream chambers;

a deflector having a sealingly closed chamber therein and deflecting in response to a pressure difference between said sealingly closed chamber and the upstream chamber; and a valve member for controlling a communication of the upstream chamber with the downstream chamber via said valve port;

said deflector commencing said deflection when a pressure at the upstream chamber is higher than a pressure in the sealingly closed chamber by a predetermined value;

said deflector being connected to said valve member in such a manner that the commencing of the deflection of the deflector causes the valve member to be detached from the valve port;

wherein said refrigerant is carbon dioxide; and said refrigerant being filled to a volume of said sealingly closed chamber as obtained when said valve member closes said valve port at a density in a range between 450 kg/m$^3$ and 950 kg/m$^3$.

* * * * *

UNITED STATES PATENT AND TRADEMARK OFFICE
CERTIFICATE OF CORRECTION

PATENT NO.    : 5,890,370
DATED         : April 6, 1999
INVENTOR(S)   : SAKAKIBARA, et al.

It is certified that error appears in the above-identified patent and that said Letters Patent is hereby corrected as shown below:

On the title page, item [73] should read

**[73]    DENSO CORPORATION, Kariya-city, Japan
NIPPON SOKEN, INC., Nishio-shi, Japan**

Signed and Sealed this

Twelfth Day of October, 1999

*Attest:*

Q. TODD DICKINSON

*Attesting Officer*     *Acting Commissioner of Patents and Trademarks*